United States Patent [19]
Sugiyama

[11] Patent Number: 5,249,048
[45] Date of Patent: Sep. 28, 1993

[54] INTERFRAME/INTERFIELD PREDICTIVE ENCODING SYSTEM

[75] Inventor: Kenji Sugiyama, Yokosuka, Japan

[73] Assignee: Victor Company of Japan, Ltd., Yokohama, Japan

[21] Appl. No.: 821,935

[22] Filed: Jan. 16, 1992

[30] Foreign Application Priority Data

Jan. 16, 1991 [JP] Japan .................................. 3-15804

[51] Int. Cl.[5] ............................................. H04N 7/137
[52] U.S. Cl. .................................... 358/136; 358/141
[58] Field of Search ............... 358/105, 133, 135, 136, 358/140, 141, 142

[56] References Cited

U.S. PATENT DOCUMENTS

| 4,985,768 | 1/1991 | Sugiyama | 358/136 |
| 5,049,991 | 9/1991 | Niihara | 358/136 |
| 5,132,792 | 7/1992 | Yonemitsu | 358/136 |

FOREIGN PATENT DOCUMENTS

3-77625  4/1991  Japan .

Primary Examiner—Howard W. Britton
Attorney, Agent, or Firm—Jacobson, Price, Holman & Stern

[57] ABSTRACT

An interframe/interfield encoding system is for coding an incoming video signal having a successive specific number of dependent frames/fields, and independent frames/fields located anterior and posterior to the dependent frames/fields on a time axis. The system has a predictor for generating prediction errors of the dependent frames/fields by the independent frames/fields and an encoder for coding the independent frames/fields and the prediction errors. The system also has a delay section delays coding the posterior independent frame/field by the specific number of dependent frames/fields on the time axis to the incoming video signal and a controller, responsive to the delaying, controls the encoder to encode the posterior independent frame/field so as to follow the coding of the prediction errors. The posterior independent frame/field, without being delayed, is employed for generation of the prediction errors.

3 Claims, 6 Drawing Sheets

INTERFRAME/INTERFIELD PREDICTIVE ENCODING SYSTEM

BACKGROUND OF THE INVENTION

The present invention relates to efficient encoding systems for efficiently coding video signals into a smaller amount of coded data on various types of system for recording, transfer and display the video signals. Particularly, the present invention relates to interframe/interfield predictive encoding systems with respect to moving images.

Moving images have a strong interframe correlation and therefore, interframe prediction coding in which interframe prediction is performed to generate prediction errors and those prediction errors are coded, is effective for coding video signals of moving images. However, recursive prediction is conventionally performed with respect to interframe predicative coding and so decoding a current frame necessitates having all of the past decoded video signals.

On one hand, for storage media such as VTR and video disks and the like, it is required to have special playback such as random access, high-speed search and reverse playback. Thus, when interframe predictive coding is used for those media, it is necessary to have independent frames which are to be coded periodically by intraframe coding without interframe prediction. Coding methods for effectively increasing the coding efficiency of those independent frames and facilitating reverse playback has been disclosed in U.S. Pat. No. 4,985,768 of the same inventor of the present invention. Furthermore, Japanese Patent Application No. 1991-77625, also of the same inventor, discloses a coding method in which the coding method disclosed in this U.S. Patent is applied to interlace signals.

Figure 1:
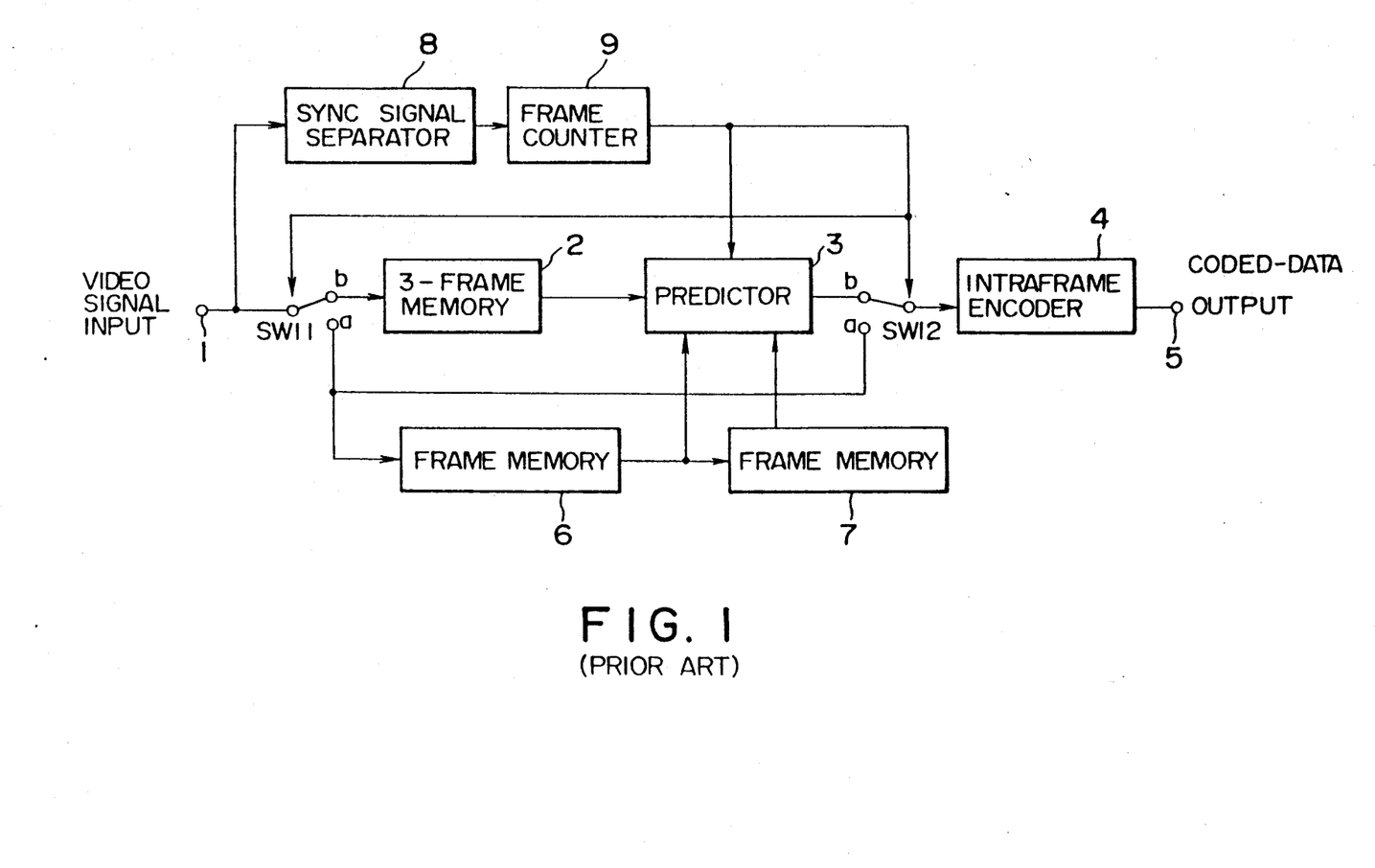
FIG. 1 is a block diagram that shows a conventional interframe predictive encoding system.

FIG. 1 is a block diagram that shows a simplification of the configuration of the interframe predictive encoding system shown in FIG. 7 of the U.S. Patent described above. In FIG. 1, the (N-1) frame memory 31 of FIG. 7 of the U.S. Patent is shown as a 3-frame memory 2 with N=4. The prediction error subtractor 2, coefficient multipliers 34 and 35, adder 36 of FIG. 7 are combined and shown as a predictor 3 in FIG. 1. Furthermore, the orthogonal transform device 3, quantizer 4 and variable-length encoder 5 of FIG. 7 are combined and shown as an intraframe encoder 4 in FIG. 1. In FIG. 1, the switch 40 of FIG. 7 of the U.S. Patent is omitted, and a synchronizing signal separator 8 and frame counter 9 are newly added.

In FIG. 1, an incoming video signal of moving images is inputted to a switch SW11 and the synchronizing signal separator 8 via an input terminal 1. The synchronizing signal separator 8 separates vertical synchronizing signals from the video signal and supplies the synchronizing signals to the frame counter 9. This frame counter 9 counts the number of frames and that count output causes the switch SW11 and a switch SW12 to be switched. When an independent frame of the video signal is inputted from the input terminal 1, the switches SW11 and SW12 are both switched to a terminal a, and when a dependent frame of the video signal is inputted from the input terminal 1, the switches SW11 and SW12 are both switched to a terminal b. When both the switches SW11 and SW12 are switched to the terminal a, the video signal that is inputted to the input terminal 1 is inputted to the intraframe encoder 4 via the switches SW11 and SW12 and is coded. Then, a coded video signal is outputted from a data output terminal 5. The incoming video signal is also inputted to a frame memory 6 and stored there. Then, a video signal that has already been stored in the frame memory 6 is inputted to a frame memory 7 and stored there.

After this, when both the switches SW11 and SW12 are switched to the terminal b, the incoming video signal that is inputted to the input terminal 1 is inputted to the 3-frame memory 2 via the switch SW11, where the signal receives a time delay of four frames. When an independent frame is inputted from the input terminal 1, the content of that frame is held by the frame memory 6 and so in the 3-frame memory 2, a 4-frame delay is performed with 3-frame capacity. In the predictor 3, a signal that has this time delay is predicted by weighting on the basis of the number of frames from two independent frames and a prediction error is generated. This error is intraframe-coded by the intraframe encoder 4 and the coded video signal is outputted from the data output terminal 5.

In the encoding system, if N=4, then it is necessary to have memories of five frames for the 3-frame memory 2 and the frame memories 6 and 7.

Figure 2:
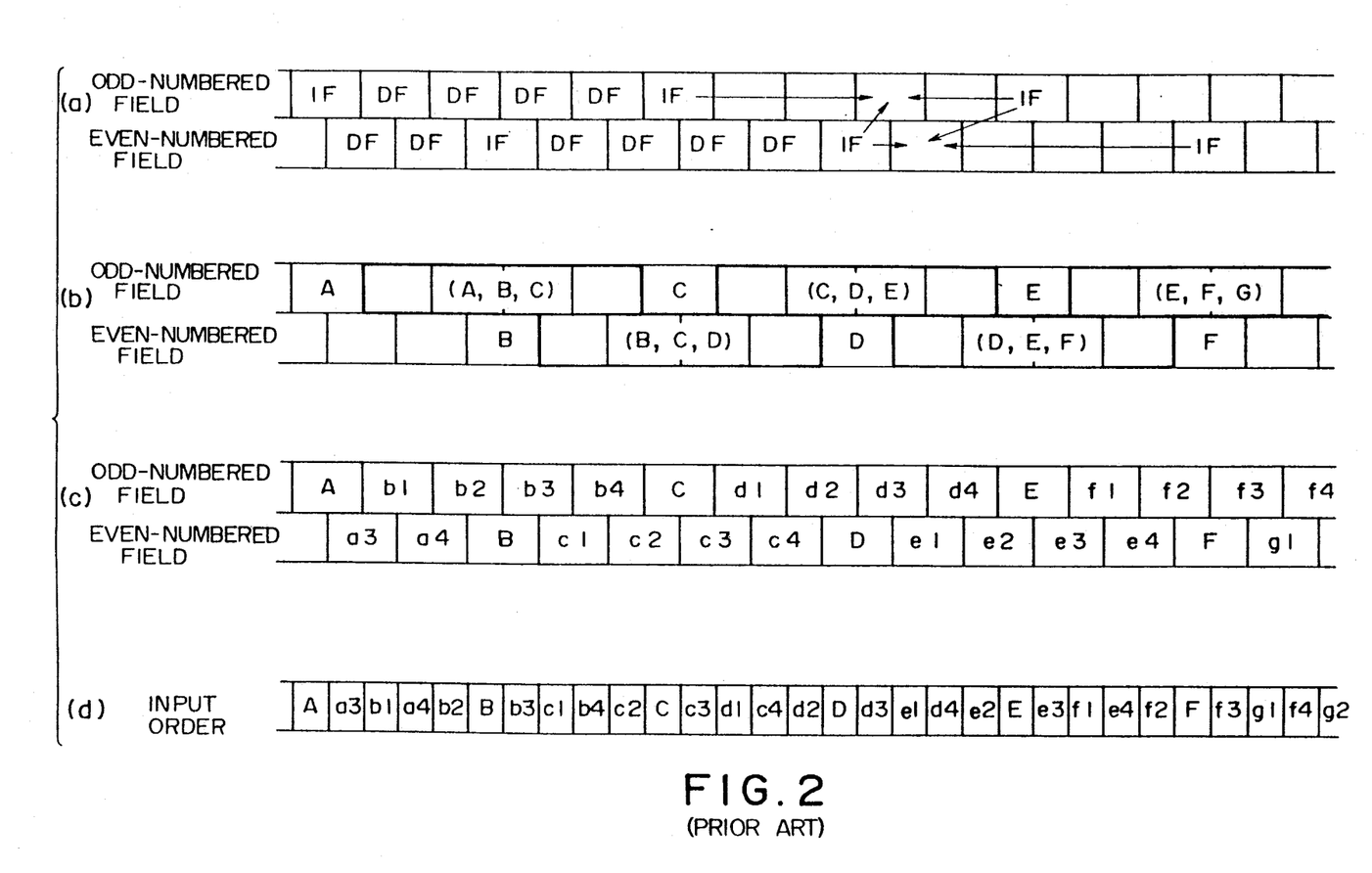
FIG. 2 is a view showing the processing timing of a conventional interfield predictive encoding system.

FIG. 2 comprising FIGS. 2(a)–2(d) is a view showing the timing of the interfield predictive coding method disclosed in Japanese Patent Application No. 1991-77625 described above. What is shown here is a coding method for interlace signals for storage media. Respective divisions in the figure are fields, and upper portions of (a) through (c) are odd-numbered fields, and lower portions of (a) through (c) are even-numbered fields. As shown in the figure, the odd-numbered fields and the even-numbered fields are mutually displaced by the time of $\frac{1}{2}$ of a frame. In FIG. 2, independent fields (indicated by IF in FIG. 2(a)) are coded by odd-numbered field intervals (5, in this case) and dependent fields between them are predicted from the independent fields located anterior and posterior to the dependent fields. Prediction is made from two independent fields or three independent fields located anterior and posterior to the dependent fields. In the case of the prediction method for a field to be predicted being an odd-numbered (even-numbered) field, that uses the three independent fields, prediction is performed from two odd-numbered (even-numbered) independent fields and one even-numbered (odd-numbered) independent field. This situation is shown in FIG. 2(a).

FIG. 2(b) shows which independent fields are used for performing the prediction. A, B and C show the independent fields. Four dependent fields surrounded by bold lines are predicted by the independent fields inside parentheses. FIG. 2(c) shows the correspondence between the center fields of the three independent fields that are used for the prediction, and the lower case letters which indicate dependent fields to be predicted from the three independent fields, with numbers indicating input order. More specifically, b1, b2, b3 and b4 are predicted from the three fields A, B and C. Then, FIG. 2(d) shows input order of fields with the dependent fields being predicted at different timings.

According to the coding method shown in FIG. 2, it is necessary to have memories for 11 field portions because of four fields for the independent fields, and the seven fields (9-field delay) for the delay of the dependent fields.

In the interframe/interfield predictive coding system of U.S. Pat. No. 4,985,768 and Japanese Patent Application No. 199-77625, there is the problem that the production cost of the system becomes higher because it is necessary to have many frame (field) memories on the interframe (interfield) prediction in a reverse direction necessary for reverse playback and the like in a VTR.

SUMMARY OF THE INVENTION

The present invention has as an object the elimination of the problems associated with the conventional technology and the provision of an interframe/interfield predictive encoding system that reduces the production cost of an encoding system by reducing the amount of frame (field) memories, and that furthermore is a more compact apparatus, and has a lower power consumption.

According to the present invention there is provided an interframe/interfield encoding system for coding an incoming video signal having specific frames/fields of every predetermined number of frames/fields and dependent frames/fields, comprising prediction means for generating prediction errors of the dependent frames/fields by means of the specific frames/fields located anterior and posterior to the dependent frames/fields on a time axis and encoding means for coding the specific frames/fields and the prediction errors, which comprises delay means for delaying coding the posterior specific frame/field by the specific number of dependent frames/fields on the time axis to the incoming video signal and control means, responsive to the delaying, for controlling the encoding means to encode the posterior specific frame/field so as to follow the coding of the prediction errors, the posterior specific frame/field, without being delayed, being employed for generation of the prediction errors.

There is also provided an interfield encoding system for predictive-coding an incoming video signal having a successive specific number of even and odd numbers of dependent fields, and independent fields located anterior and posterior to the dependent fields, the dependent and independent fields having a specific incoming order on a time axis, which comprises encoding means, in a case that there are different sets of independent fields, among the independent fields, for respectively predicting the even and odd numbers of dependent fields, and among the dependent fields, there is a plurality of dependent fields which are all predicted by means of a group of independent fields among the independent frames, for successively coding the plurality of dependent fields by means of the group of independent fields without respect to the specific incoming order of the dependent and independent fields of the incoming video signal.

The other objects and features of this invention will become understood from the following description with reference to the accompanying drawings.

DESCRIPTION OF THE PREFERRED EMBODIMENTS

Figure 3:
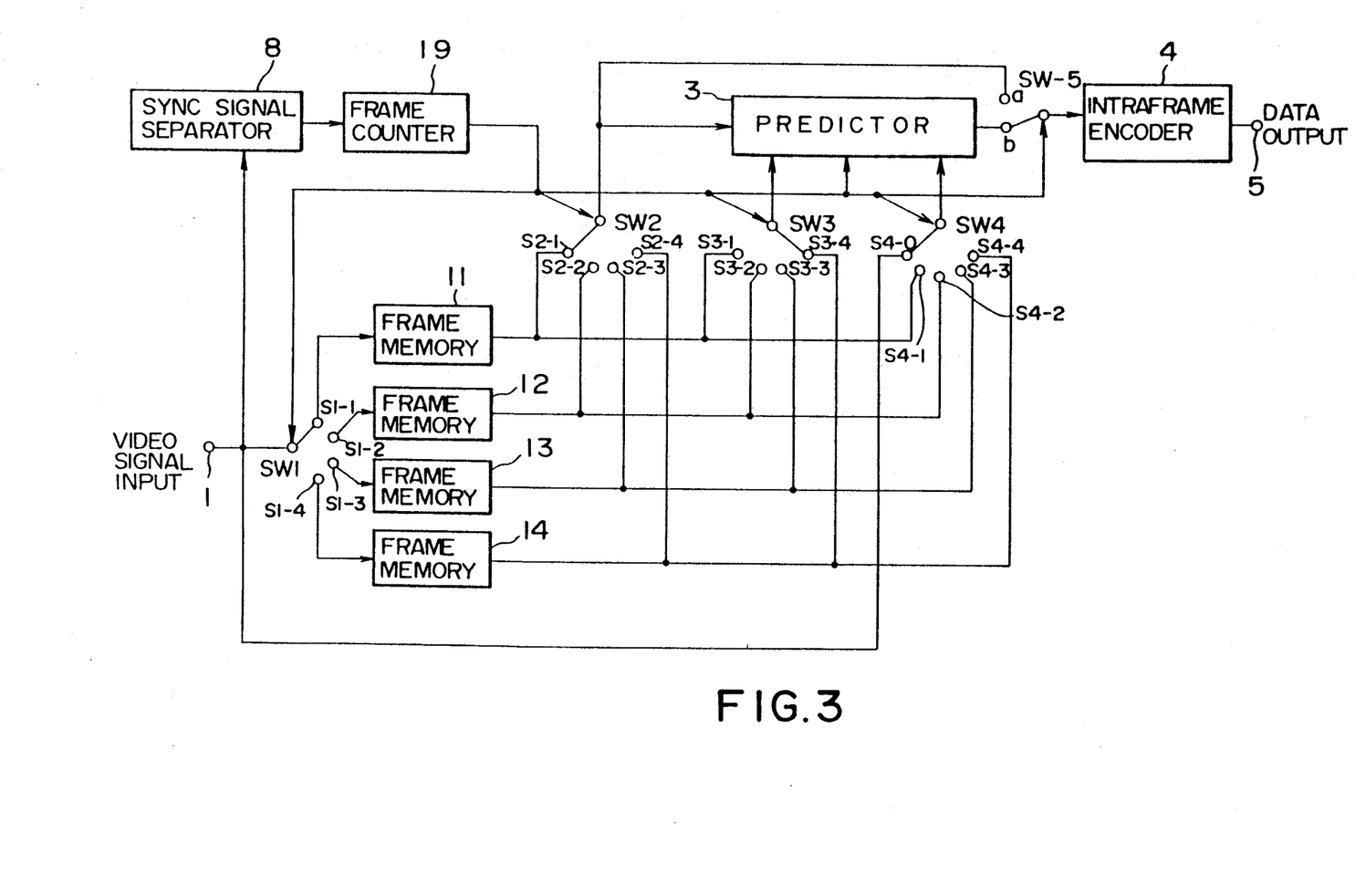
FIG. 3 is a block diagram showing an interframe/interfield predictive encoding system of a first preferred embodiment according to the present invention.
Figure 4:
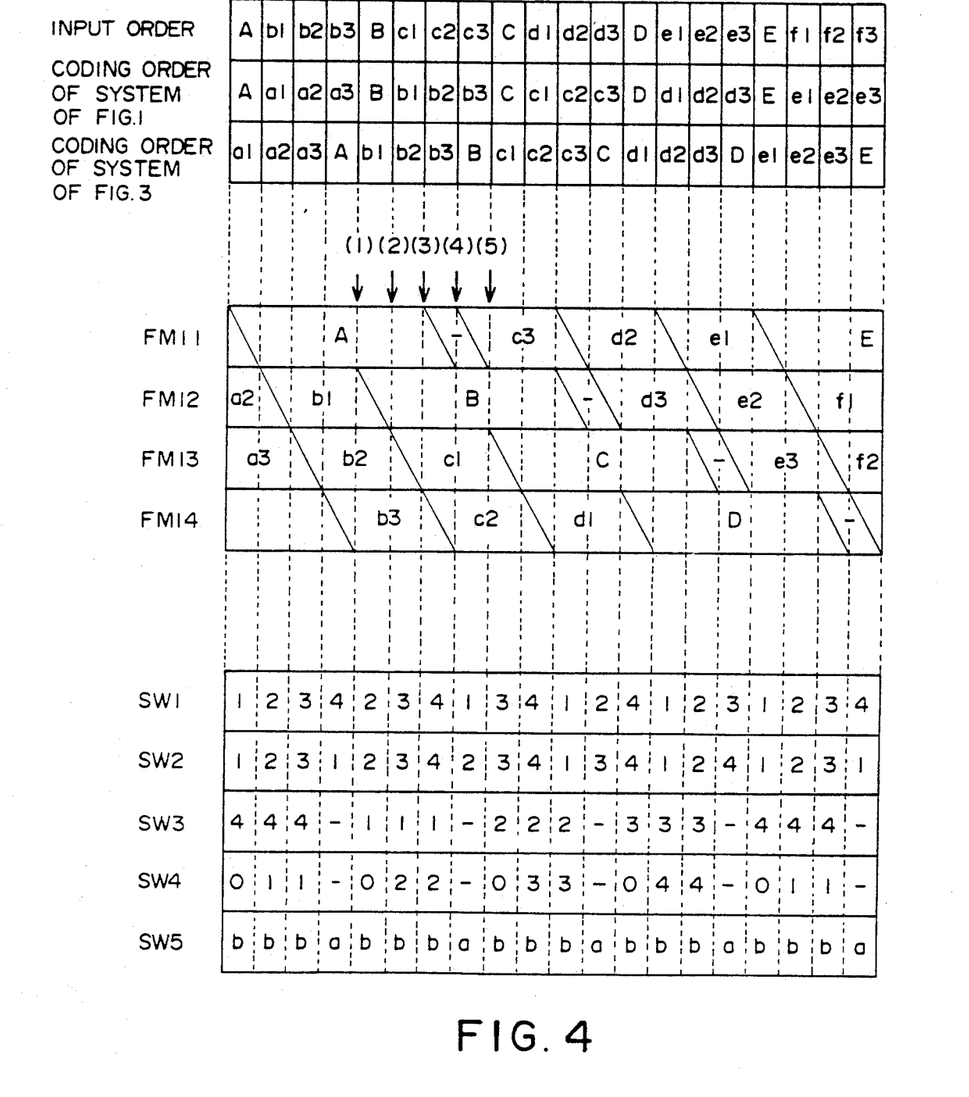
FIG. 4 is a view showing the processing timing of the first embodiment of the present invention.

The following is a description of an interframe/interfield predictive encoding system of a first embodiment according to the present invention with reference to FIGS. 3 and 4. This coding system uses current frames for prediction without local decoding signals of independent frames. The interval N of the independent frames is 4. The basic coding processing of this embodiment is the same as the processing in the coding system shown in FIG. 1 but usage of the frame memories and the coding order differ in a manner which will be described later. In addition, with the coding system shown in FIG. 1, it is necessary to have frame memories of a total of five frames for the 3-frame memory 2 and the frame memories 6 and 7 but as is clear from FIG. 3, the present embodiment can have frame memories of a total of four frames for frame memories 11 through 14.

In FIG. 3, an incoming signal of moving images from an input terminal 1 is inputted to a synchronizing signal separator 8 which separates vertical synchronizing signals from the video signal and these vertical synchronizing signals are inputted to a frame counter 19. The frame counter 19 counts the number of frames. Each of the frames is processed according to the frame numbers that are counted.

In FIG. 3, the frame memories 11 through 14 are used in common for the independent frames and dependent frames. The incoming video signal inputted from the input terminal 1 is inputted to either of the frame memories 11 through 14 via a switch SW1. The output of the frame memories 11 through 14 are respectively connected to either of switches SW2 through SW4. In addition, the incoming video signal that is inputted from the input terminal 1 is directly inputted to the switch SW4. The switch SW2 is for selecting independent frame signals and dependent frame signals, and the switches SW3 and SW4 are for selecting the independent frame signals for prediction. A switch SW5 is for selecting between independent frames and dependent frames and switches to an a side for the case of the independent frame to lead the output of the switch SW2 to an intraframe encoder 4 without passing through a predictor 3, and switches to a b side for the case of the dependent frame to lead the output of the predictor 3 to the intraframe encoder 4.

FIG. 4 is a view showing the processing timing of the first embodiment of the present invention. Moreover, to facilitate comparison, the coding order of the encoding system shown in FIG. 1 is also shown. In FIG. 4, the upper case letters A, B and C indicate the independent frames, the lower case letters indicate the dependent frames corresponding to the independent frames, and numerals subscripted with the lower case letters indicate the order of input. For example, each of frames b1, b2 and b3 are predicted from the two independent frames A and B. The upper row of FIG. 4 indicate the input order, each coding order of FIG. 1 and coding order of the first embodiment. As is clear from this, when compared to the encoding system of FIG. 1, in the first embodiment the independent frames are delayed by three frames and the dependent frames are coded one frame earlier.

The middle row of FIG. 4 show to which of the frame memories (indicated by FM) 11 through 14 respective frames are stored and at what timing the respective frames receive delays of what number of frames. In these middle row, the diagonal lines in divisions indicate that the contents of the frame memory are swapped over the time of one frame portion, to be changed. In addition, dashes indicate the timing when it is not necessary to store anything in the frame memory and the contents of the frame memory are not needed to be erased, thus the status remaining the same. For example, the dependent frame b3 is predicted using the independent frames A and B and so it is necessary to have the independent frame A until the end of coding of the dependent frame b3. Accordingly, the independent frame A is stored in the frame memory 11 until the end of the coding of the dependent frame b3. The contents of the frame memories are returned to the contents of the initial status by 16 frames, and the control of the input and output of the frame memories can be repeated in units of 16. More specifically, the frame counter 19 shown in FIG. 3 is a hexadecimal counter.

Selection of the switches SW1 through SW5 shown in the lower row of FIG. 4 is performed so as to correspond to the input and output control of the frame memories of the middle row of FIG. 4. Here, numerals indicate the terminal numbers of each of the switches. Terminal numbers 1 through 4 correspond to the frame memories 11 through 14. Terminal number 0 corresponds to the incoming video signal that is directly inputted from the input terminal 1. The switches 3 and 4 are not necessary in the case of independent frame coding and so dashes indicate that the terminal number can be any number. In FIG. 1, the incoming video signal is not used for prediction but in the first embodiment, the dependent frames are advanced and so the incoming video signal is used for prediction. On the other hand, the signals that are to be coded are all outputted from one of the frame memories 11 through 14. The switches SW1 and SW2 have the same terminal number in the case of the dependent frames, that is, the switches SW1 and SW2 are connected to the same frame memory.

The following is a description of the coding processing of the first embodiment, with reference to FIG. 3 and FIG. 4. Here, in the order of coding of the embodiment of the upper row of FIG. 4, the description is given for the status where an independent frame A is coded first and dependent frames b1, b2 and b3, and an independent frame B then are coded in order. Arrows (1) through (5) in the middle row of FIG. 4 show the timing of each processing.

STEP (A): In the initial status, the independent frame A is stored in the frame memory 11, the dependent frame b1 is stored in the frame memory 12, the dependent frame b2 is stored in the frame memory 13, and the dependent frame b3 is stored in the frame memory 14. The independent frame A is further inputted to the intraframe encoder 4 via the switches SW2 and SW5 and is thereby coded.

STEP (B): At the timing shown by the arrow (1), when the independent frame B is inputted from the input terminal 1, the frame counter 19 counts a frame number of the independent frame B and the switch SW1 is switched to its terminal S1-2, the switch SW2 is switched to its terminal S2-2, switch SW3 is switched to its terminal S3-1, switch SW4 is switched to its terminal S4-0, and switch SW5 is switched to its terminal b. The independent frame B is then inputted to the frame memory 12 via the switch SW1 and stored, and is also inputted to the predictor 3 from the input terminal 1 and via the switch SW4. Simultaneous with this, the dependent frame b1 stored in the frame memory 12 in step (A) is inputted to the predictor 3 via the switch SW2. Furthermore, the independent frame A stored in the frame memory 11 in step (A) is inputted to the predictor 3 via the switch SW3.

STEP (C): The predictor 3 determines a prediction error of the dependent frame b1 from the independent frames A and B, and inputs that prediction error to the intraframe encoder 4, where it is coded. This processing ends at the timing of the arrow (2).

STEP (D): When the dependent frame c1 is inputted from the input terminal 1 at the same time as the processing of step (C) ends at the timing shown in the arrow (2), the frame counter 19 counts a frame number of the dependent frame c1 and the switch SW1 is switched to its terminal S1-3, the switch SW2 is switched to its terminal S2-3, and the switch SW4 is switched to its terminal S4-2. The switches SW3 and SW5 stay in the same status as step (B). When this is done, the dependent frame c1 is inputted to the frame memory 13 via the switch SW1 and stored, and simultaneous with this, the dependent frame b2 stored in the frame memory 13 in step (A) is inputted to the predictor 3 via the switch SW2. Furthermore, the independent frame A stored in the frame memory 11 in step (A) is inputted to the predictor 3 via the switch SW3 and the independent frame B stored in the frame memory 12 in step (B) is inputted to the predictor 3 via the switch SW4.

STEP (E): Coding of the dependent frame b2 is performed in the same manner as STEP (C). This processing ends at the timing shown by the arrow (3).

STEP (F): At the same time as the processing of STEP (E) ends at the timing of the arrow (3), the dependent frame c2 is inputted from the input terminal 1. dependent frame c2 is inputted from the inputted terminal 1. The frame counter 19 counts a frame number of the dependent frame c2, and the switch SW1 and SW2 are respectively switched to their terminals S1-4 and S2-4. The switches SW3, SW4 and SW5 remain in the same status as STEP (D). When this occurs, the dependent frame c2 is inputted to the frame memory 14 via the switch SW1 and stored, and at the same time as this, the dependent frame b3 stored in the frame memory 14 in step (A) is inputted to the predictor 3 via the switch SW2. The switches SW3 and SW4 stay in the same status as for STEP (D) and so the independent frames A and B respectively stored in the frame memories 11 and 12 in step (A) are inputted to the predictor 3. Coding of the dependent frame b3 is performed in the same manner as for step (C) and this processing ends at the timing shown by the arrow (4). After this, the independent frame A is not necessary any more.

STEP (G): At the same time as the processing of STEP (F) ends at the timing shown by the arrow (4), the dependent frame c3 is inputted from the input terminal 1. A frame number of the dependent frame c3 is counted by the frame counter 19 and the switches SW1 and SW2 are switched to their terminals S1-1 and S2-2. Furthermore, the switch SW5 is switched to its terminal a. The switches SW3 and SW4 stay in the same status as STEP (F). When this occurs, the independent frame B stored in the frame memory 12 in step (B) is inputted to the intraframe encoder 4 via the switches SW2 and SW5 and is coded there.

Figure 5:
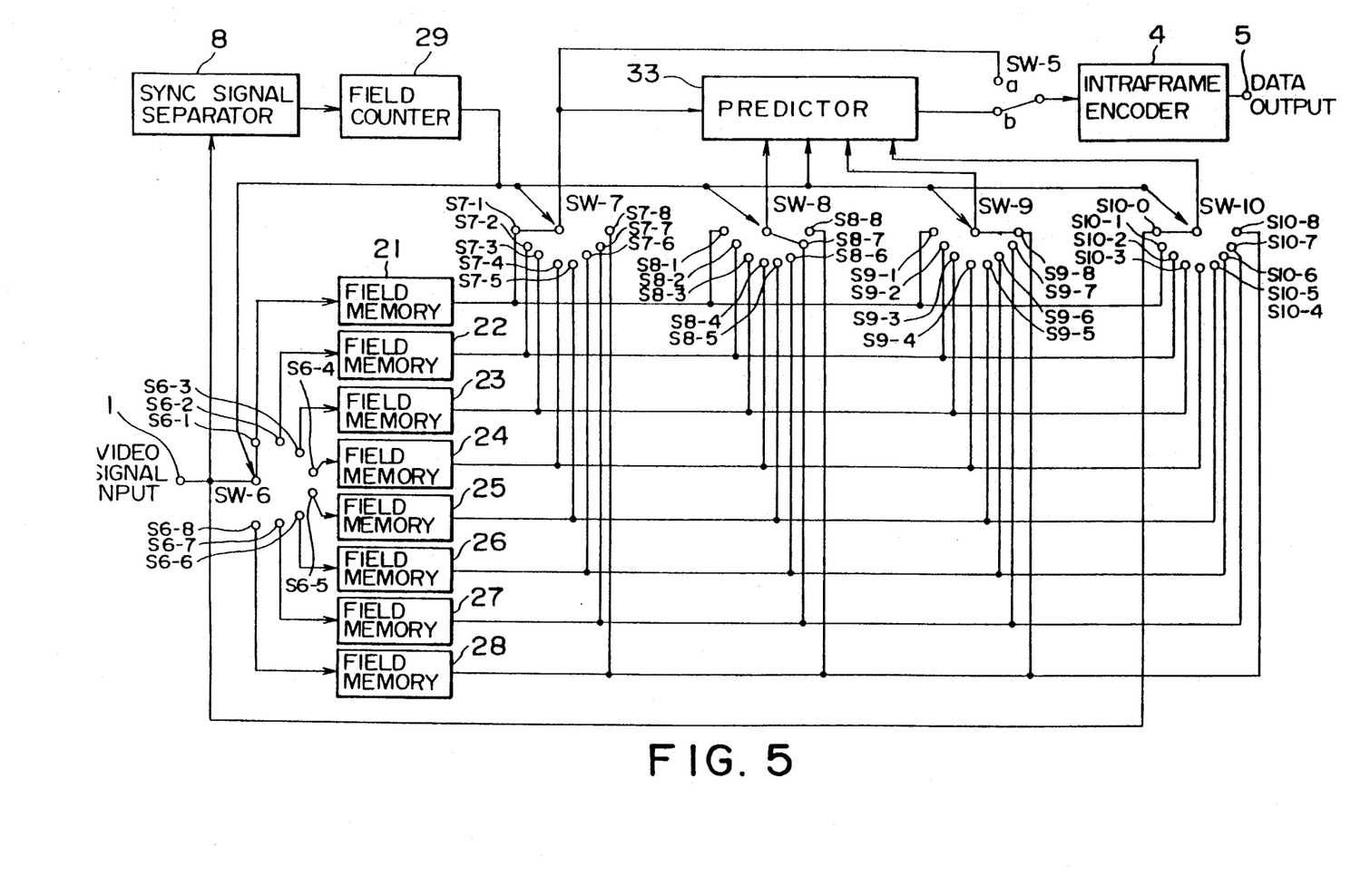
FIG. 5 is a block diagram showing an interframe/interfield predictive encoding system of a second embodiment according to the present invention.
Figure 6:
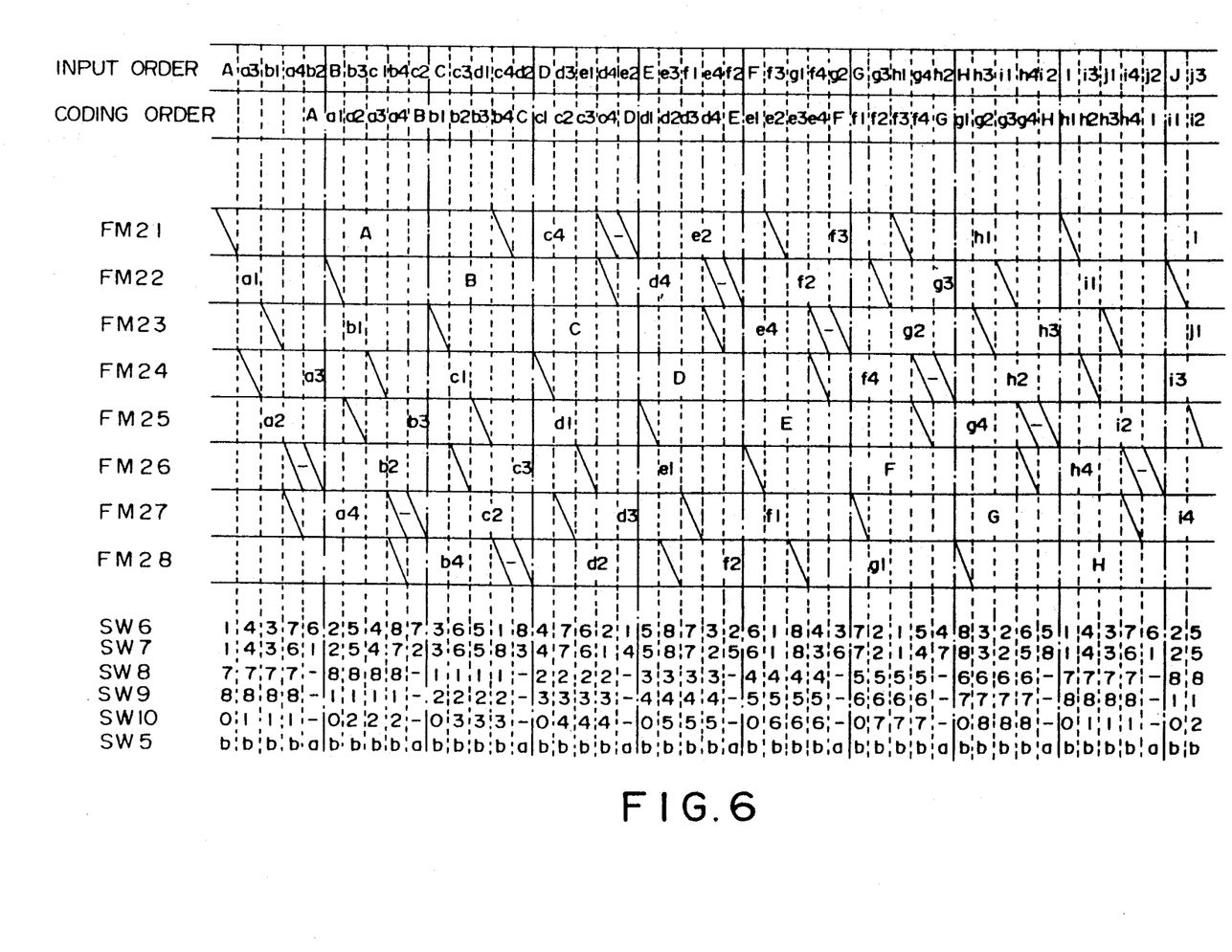
FIG. 6 is a view showing the processing timing of the second embodiment of the present invention.

The following is a description of the interfield prediction encoding system of a second embodiment according to the present invention and with reference to FIG. 5 and FIG. 6. In the second embodiment, the coding of independent fields is delayed at the same timing as for the first embodiment. Furthermore, the fields predicted from the same independent field are processed continuously so that it is possible to have coding with eight field memories. FIG. 5 is a block diagram showing an interframe/interfield predictive encoding system of the second embodiment, with portions that correspond to those in FIG. 3 being indicated with corresponding numerals. Whereas there are four frame memories in the first embodiment, the second embodiment is provided with eight field memories and corresponding to this, switches SW7 through SW9 are provided with eight terminals each. In addition, there is also a switch SW10 for prediction from three fields.

The following is a description of the processing timing of this embodiment, with reference to FIG. 6. In FIG. 6, the diagonal hatching and the dashes have the same meanings as they did in FIG. 4. The upper row of FIG. 6 shows the input order the input order and the coding order. With the input order, fields of different prediction types alternate but the coding order combines those of the same prediction type. The prediction type is indicative of whether a field is an odd- or even-numbered dependent field. When the object of prediction is an odd-(even-)numbered dependent field, a prediction error is determined from three independent fields those being odd-(even-)numbered independent fields located anterior and posterior to the dependent field, and an even-(odd-)numbered independent field located between those two odd-(even-)numbered dependent fields.

The middle row of FIG. 6 show the contents of field memories 21 through 28. Control of the input and output of the field memories is repeated for every $5 \times 8 = 40$ fields. The contents of each of the field memories are respectively shifted by five fields to become the same type of contents.

Furthermore, the lower row of FIG. 6 show the selection of terminals of the switches SW5 through SW10. In the operation of switches SW6 and SW7, selection numbers are incremented by one for each five-field cycle. For example, with switch SW6, 1, 4, 3, 7, 6 are followed by $1+1, 4+1, 3+1, 7+1, 6+1=2, 5, 4, 8, 7$. This is the same for terminals of switches SW8, SW9 and SW10 other than its terminal 0. The next terminal after a terminal 8 is 1. The switches SW8 through SW10 have regulated selection of their terminals. Accordingly, a field counter 29 shown in FIG. 5 has a combination of pental and octal counting.

The coding processing in the second embodiment is fundamentally the same as the coding processing in the first embodiment as shown by STEP (A) through STEP (G), so a description of the coding processing in the second embodiment is omitted here.

As has been described above, in the interframe/interfield predictive encoding system of the present invention, the timing for the coding of independent frames/fields is delayed and the coding of frames/fields by interframe/interfield prediction is performed first. Furthermore, dependent fields of the same prediction type are combined and coded. Accordingly, the amount of frame/field memories necessary for coding processing can be made smaller and it is possible to reduce the production cost of an encoding system.

It is furthermore possible to make the encoding system smaller and for it to have a lower power consumption.

While the presently preferred embodiments of the present invention have been shown and described, it is to be understood that the independent frames or fields are not limited to literally "independent" ones, but they may be such specific frames or fields as not to be backwardly predicted, that is, they may be forwardly predicted from other specific frames or fields.

What is claimed is:

1. A system for coding an incoming video signal divided into at least one group of frames and anterior and posterior frames located anterior and posterior, on a time axis, to the group of frames, the system comprising:
   latching means for latching the anterior and posterior frames and said at least one group of frames;
   coding means for coding the anterior and posterior frames by intraframe coding and the group of frames by interframe coding using the anterior and posterior frames; and
   controlling means for picking out the latched frames at fixed intervals to execute the coding, on the time axis, such that the anterior frame is picked first, the group of frames is picked second and the posterior frame is picked third.

2. A method of coding an incoming video signal divided into at least one group of frames and anterior and posterior frames located anterior and posterior, on a time axis, to said at least one group of frames, the method comprising the steps of:
   latching the anterior and posterior frames and said at least one group of frames;
   coding the anterior and posterior frames by intraframe coding and said at least one group of frames by interframe coding using the anterior and posterior frames; and
   picking out the latched frames at fixed intervals to execute the coding, on the time axis, such that the anterior frame is picked first, the group of frames is picked second and the posterior frame is picked third.

3. A system for coding an incoming video signal divided into at least one group of frames, said at least one group of frames comprising a first group of fields and a second group of fields, each field of the first group of fields constituting a frame with one of the fields of the second group of fields, the system comprising:
   latching means for latching a first field and a last field, on a time axis, of the first group and a middle field, on the time axis, of the second group and other fields of the first and second groups;
   coding means for coding the first, middle and last fields by intrafield coding and the other fields of the first and second groups by interfield coding using the first, middle and last fields; and
   controlling means for picking out the latched fields at fixed intervals to execute the coding, on the time axis, such that the first field is picked first, the first group of fields is picked second, the middle field is picked third, the second group of fields is picked fourth and the last field is picked last.

* * * * *